United States Patent Office 2,900,285
Patented Aug. 18, 1959

2,900,285

PROCESS FOR CLEANING THE CHAMBERS OF REGENERATIVE FURNACES

Otto Darmann, Helmut Kobusch, and Karl Georg Speith, Duisburg, Germany, assignors to Mannesmann Aktiengesellschaft, a company of Germany No Drawing. Application October 4, 1956
Serial No. 613,812

Claims priority, application Germany October 7, 1955

4 Claims. (Cl. 134—2)

This invention relates to a process for cleaning the chambers of regenerative furnaces and in particular the air chambers of Siemens-Martin furnaces. These chambers are subject to wear. Continuous operation at high temperatures and a steady build-up of slag on the surface of the fire-bricks, which is caused by the oxides contained in the flue gas, leads to molten metals whose temperatures are below the temperature of the brick material. The fire-bricks in the upper layers are continuously reduced in size and the material coming off is deposited in lower sections of the checkers and in the ducts. Alkalies and dust contained in the raw materials contribute to this process. The heat-storage capacity of the chambers deteriorates continuously while the heat consumption of the furnace increases. The heat exchange between the fire-bricks, which are steadily reduced in thickness and which frequently become glazed or infiltrated, and the gas or air passing through the chambers is reduced. However, this process may be considered normal wear, which ultimately makes dismantling and re-construction of the chambers necessary.

In addition to such normal wear other effects have been observed, which either in combination with the previously described wear or possibly by themselves cause a premature choking, particularly of the air chambers. These effects cannot be considered "normal wear." Analyses of the substances deposited in the air chambers have disclosed that these deposits may contain more than 50% of zinc oxide in addition to lead compounds, considerable quantities of which later compounds are also found to be included in these deposits. These substances originate from processing large quantities of scrap, particularly random scrap which contains considerable amounts of galvanised and similarly treated material.

An attempt has been made to remove the dust deposits from the checker chambers of regenerative furnaces, such as Siemens-Martin furnaces, by a "melting-out process." In particular, this process has been applied to Siemens-Martin furnaces which are worked with carburetted water gas and which operate with an addition of brown-coal as a carburetting agent. All attempts to remove the deposits by this process failed. The deposits were melted and moved from their original position, but the molten material solidified again approximately 2 metres below the top edge of the checkers and caused there an even more complete choking of the checkers.

Further, an attempt has been made to remove or stop the formation of non-combustible deposits, such as iron oxide, by passing fresh air through the gas chambers and fresh fuel gas through the air chambers. The disadvantage of this process is that the flue gases are removed through the opposite side of the furnace, so that the deposits removed from the chambers of one side of the furnace are again deposited in the chambers of the other side of the furnace.

It has been observed that in Siemens-Martin furnaces operated with semi-water gas only the air chambers have deposits containing zinc and lead while such deposits are practically non-existent in the gas chambers. The obvious conclusion is that the gas reacts with the substances which contain zinc and lead and which originate from the scrap.

The invention consists in a process for cleaning the air chambers of a regenerative furnace, wherein blast furnace gas is introduced from the direction of the hearth into the air chambers and immediately thereafter removed through a chimney.

Preferably the blast furnace gas is introduced through the gas chambers located on one side of the hearth and removed through the air chambers located on the other side of the hearth.

Alternatively the blast furnace gas is introduced into the air chambers from the top without passing through the hearth.

One method of putting the invention into effect is to introduce blast-furnace gas at a rate of 9500 cubic metres per hour for two hours into the chambers of a Siemens-Martin furnace having a capacity of 150 tons. If this is done, thick white-grey clouds emerge from the chimney which indicate the expulsion of a dust-like material, whose composition when checked and analysed shows the following contents:

Approximately 20% of lead sulphate
16 to 35% of zinc sulphide
16 to 38% of zinc oxide while the remainder contains zinc sulphate and traces of alkaline oxides.

Even if the air chambers of the furnace are almost completely choked and would lead, under normal circumstances, to a premature closing down of the furnace, they will be successfully restored to a condition corresponding to normal wear by applying a cleaning process according to the invention. A hearth pressure of 2 mm. water gage which is the most suitable for melting, may be maintained for several weeks, even if prior to cleaning the pressure had already amounted to 5 mm. water gage and was accompanied by a considerable "flaming" from the furnace doors.

In contrast to the "melting-out process" previously referred to for which temperatures exceeding 1400° C. are required, a process according to the invention may be operated at a temperature at which the deposits in the checkers do not melt. On the contrary, melting of the deposits is deliberately avoided. Therefore, temperatures not exceeding 1300° C. (read above the checkers as usual) are preferred; these temperatures, on the one hand, suffice to "reduce" the deposits with sufficient speed, and, on the other hand, make certain that the deposits will not melt. No air should be passed through the furnace with the blast furnace gas; for this puppose the air valves on either side of the furnace should be closed and the crown of the furnace should be sealed as tightly as possible. The pressure in the hearth should be kept sufficiently high for flames to emerge from the doors so that air will not infiltrate. It may not be possible to avoid entirely the infiltration of any air; this is not important as long as the quantity is not such as to cause the temperature to rise above 1300° C.

The invention is also applicable to furnaces having no gas chambers, for instance, to furnaces using carburetted water gas, or natural gas and to oil-fired furnaces, provided suitable safety measures are adopted, i.e. the infiltration of air is prevented. It is possible in these cases also to pass the blast furnace gas through the chambers from the top.

A process according to the invention may also be applied to prevent deposits building-up. Further, the application of the invention is not restricted to breaks in the operation of the plant, but may also be carried out, if necessary, whilst the melting is in progress.

What we claim as our invention and desire to secure by Letters Patent of the United States is:

1. A process for cleaning the air chambers of a Siemens-Martin regenerative furnace which has air chambers in addition to gas chambers, which comprises introducing blast furnace gas into the air chambers while excluding the admission of air, and then immediately removing the gas through a chimney.

2. A process for cleaning the air chambers of a Siemens-Martin regenerative furnace having air chambers on one side of the furnace and gas chambers on the other; which comprises leading blast furnace gas through the gas chambers on one side of the furnace and followed by the step of leading the gas off through the air chambers on the other side and into a chimney.

3. A process for cleaning the air chambers of a Siemens-Martin regenerative furnace according to claim 1, distinguished in that the blast furnace gas is introduced into the air chambers from above.

4. A process for cleaning the air chambers of a Siemens-Martin regenerative furnace which has air chambers in addition to gas chambers, which comprises introducing blast furnace gas with a temperature of not over 1300° C. into the air chambers while excluding the admission of air, and then immediately removing the gas through a chimney.

References Cited in the file of this patent

UNITED STATES PATENTS

| | | |
|---|---|---|
| 2,288,980 | Turin | July 7, 1942 |
| 2,619,434 | Kraus et al. | Nov. 25, 1952 |